Sept. 20, 1966  W. RIZK  3,274,395
TURBOGENERATORS

Filed March 2, 1964  2 Sheets-Sheet 1

Sept. 20, 1966

W. RIZK 3,274,395

TURBOGENERATORS

Filed March 2, 1964

United States Patent Office

3,274,395
Patented Sept. 20, 1966

3,274,395
TURBOGENERATORS
Waheeb Rizk, Whetstone, England, assignor to The English Electric Company Limited, London, England, a British company
Filed Mar. 2, 1964, Ser. No. 348,723
Claims priority, application Great Britain, Mar. 8, 1963, 9,290/63
5 Claims. (Cl. 290—52)

This invention relates to turbogenerators. For the purpose of this specification, a turbogenerator is considered to include an A.C. or D.C. generator and a turbine connected to the generator to drive it. The invention is particularly applicable to large turbogenerators, e.g. those with an output in excess of 30 mw.

According to one aspect of the invention, a turbogenerator includes an electric generator mounted with its axis of rotation vertical and driven by a steam or gas turbine.

According to another aspect of the invention, a turbogenerator includes an electric generator driven by a coaxial turbine, the axis of rotation of the generator and turbine being vertical, and the turbine being driven by gas from a number of gas-producer units.

The gas-producer units are preferably gas turbine gas-producer units disposed with their axes generally radially (as herein defined) of said axis of rotation, and are also preferably disposed below the plane of the turbine and exhaust upwardly through it.

The term "generally radially" is defined as meaning within an angle of 45° of the true radial direction.

According to another aspect of the invention, a turbogenerator includes an electric generator driven by a turbine, the turbine is driven by gas from a number of gas-producer units through a number of ducts, one from each unit, which at their outlet ends are joined to form an annularly-extending assembly or assemblies, and the turbine is designed so that the predominant part of the pressure drop takes place in the stationary nozzle guide vanes of the turbine, the rotating blading thus being substantially of impulse design. Preferably at least 90 percent of the pressure drop takes place in the stationary nozzle guide vanes.

According to yet another aspect of the invention a turbogenerator includes an electric generator mounted with its axis of rotation vertical, and so designed that the rotor of the generator may be removed vertically without dismantling the complete stator thereof.

Features of the invention will be apparent from an embodiment thereof, which will now be described by way of example with reference to the accompanying drawings, of which:

Figure 1:
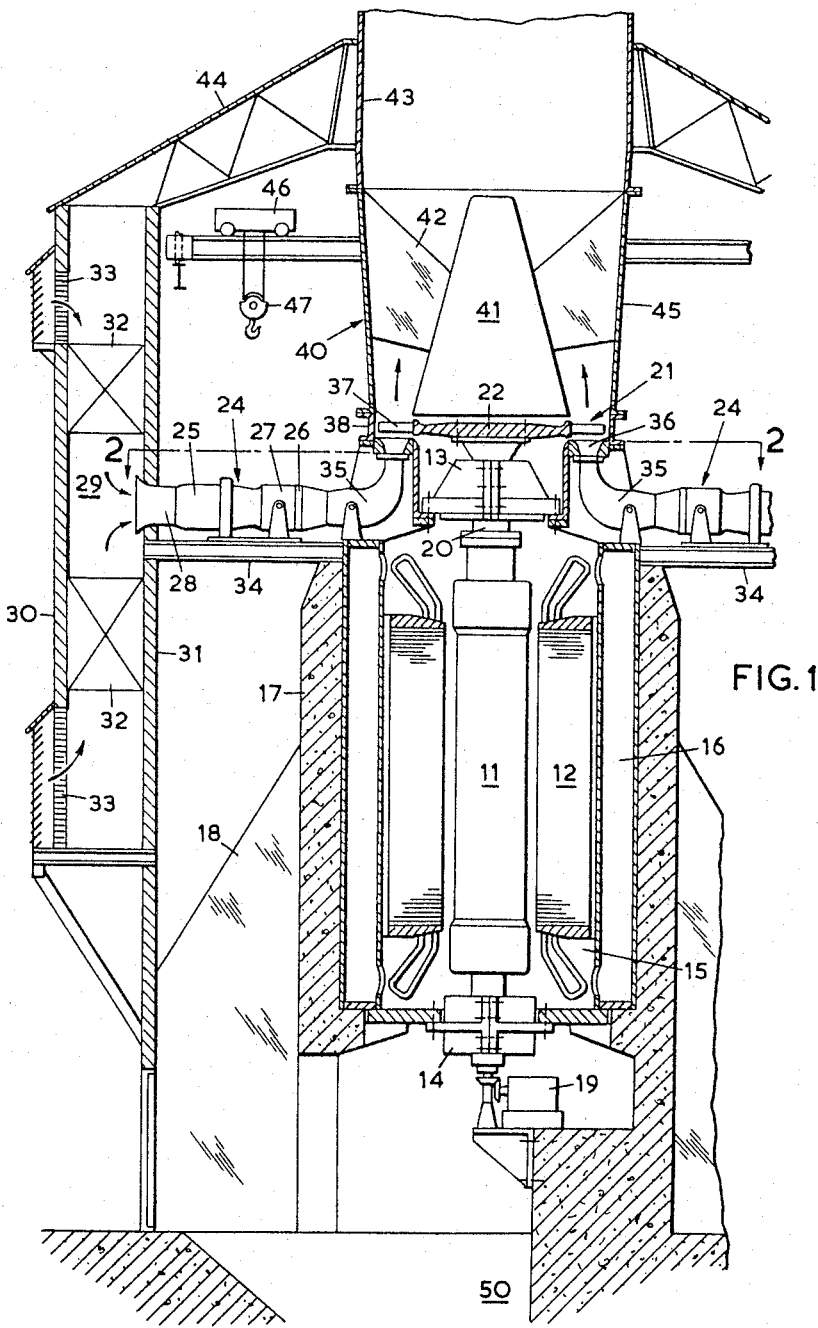
FIG. 1 is a diagrammatic vertical section through a turbogenerator installation.
Figure 2:
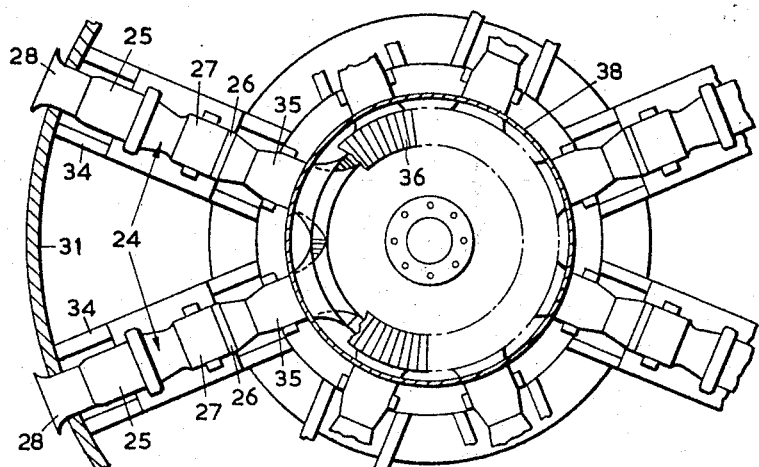
FIG. 2 is a partial sectional view on line 2—2 of FIG. 1.
Figure 3:
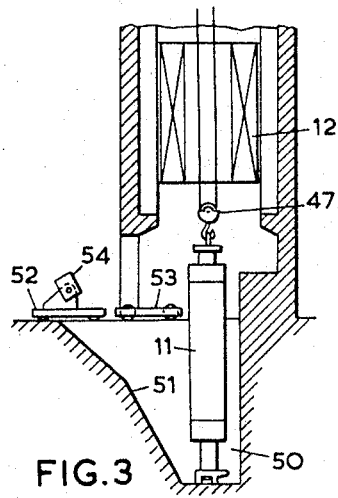
FIGS. 3, 4 and 5 are diagrams showing a method of removal of the rotor of the generator.
Figure 4:
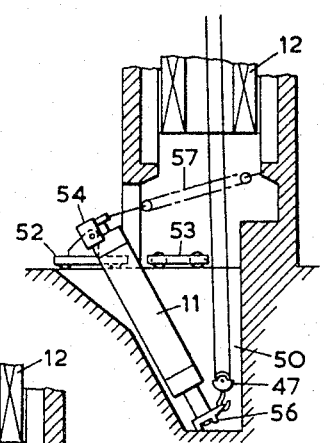
Figure 5:
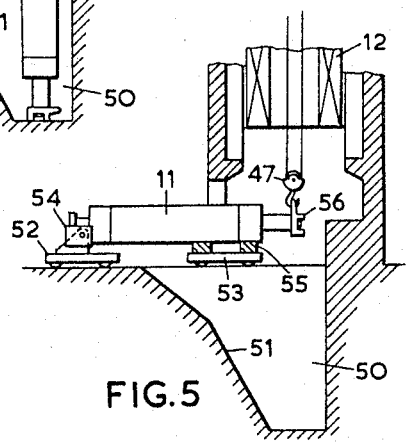

Referring now to FIGS. 1 and 2, the generator includes a rotor 11 mounted within a stator winding 12. Contrary to the usual practice, the rotor rotates about a vertical axis, for which purpose it is mounted in bearings 13, 14, one of which is a thrust bearing. The stator winding 12 is mounted in a cylindrical casing 15 which incorporates cooling passages 16. The stator casing 15 is mounted directly in a cylindrical concrete housing 17 which may be provided with radially-extending ribs 18. The exciter and auxiliaries 19 of the generator may be mounted below the generator and driven through bevel gearing.

The rotor 11 is driven through a shaft 20 by a turbine 21, of which the disc 22 lies in a horizontal plane.

The turbine 21 is driven by the exhaust gases from eight gas turbine gas-producer units 24, each of which may be a known design of aircraft gas turbine jet-propulsion engine and may comprise an axial-flow compressor 25 driven by a turbine 26 and having a combustion chamber 27. Air is drawn in through an air intake 28, is compressed in the compressor 25, and has fuel burnt in it in the combustion chamber 27, the products of combustion expanding through the turbine 26, which drives the compressor 25, but still possessing very considerable energy on the downstream side of turbine 26, where the pressure is higher than atmospheric pressure.

The gas-producer units are preferably disposed with their axes lying in the generally radial direction (as herein defined), being shown truly radial. Any convenient number of units may be employed.

The intakes 28 of the gas turbine gas-producer units 24 extend into an annular space 29 between two concentric circular walls 30, 31 of the installation. The outer wall 30 is supported from the inner wall 31, and air may flow both downwards through the upper part of the space 29 and upwards through the lower part of the space to the intakes 28 of the gas turbine units 24. Silencing means 32 may also be provided between the walls 30, 31, and filtration means 33 may be provided in the plane of the outer wall 30.

The gas turbine units 24 are supported on beams 34 which extend between the inner wall 31 and the top of the concrete housing 17.

Each unit 24 discharges its exhaust gas through a separate duct 35, the inlet end of which is circular and the outlet end of which is in the form of an arcuate, annularly-extending passage over an arc of 45°. Thus the outlets from the eight engines together form a complete annulus made up of the separate outlets which discharge directly into the nozzle guide vanes 36 of turbine 21. The nozzle guide vanes 36 are designed so that substantially all the pressure energy of the gas is converted into velocity; at least 80 percent, and preferably at least 90 percent, of the pressure drop takes place in the nozzle guide vanes.

The turbine rotor blades 37 are thus substantially of impulse design; i.e. there is substantially no pressure drop from the upstream side of the rotor blades to the downstream side.

The nozzle guide vanes 36 and the turbine shroud 38 may be mounted from the stator casing 15 of the generator. The outlets from ducts 35 need not necessarily form a complete annulus.

The turbine 21 discharges directly into a vertical stack 40, and a conical fairing 41 may be provided downstream of the turbine disc and supported through struts 42 from the stack. The latter may have an upper part 43 supported by the roof structure 44 of the installation, and the lower part 45 of the stack may be removable in sections to allow the beam of a travelling crane 46 to be positioned for lifting purposes.

It will be apparent that the gas turbine units 24 and the turbine 21 may be arranged to be readily accessible for any maintenance that may be required. For example, it may be arranged that the rotor blades 37 of the turbine 21 may be inspected in situ, and that the turbine disc 22 complete with blades 37 may be lowered to the ground through the space between a pair of gas turbine units 24. Moreover it may be arranged that each necting it from its intake 28 and exhaust duct 35, suspending the unit from an overhead crane such as crane 46, and lowering it to the ground between the wall 31 and the concrete housing 17. Moreover, the exciter and auxiliaries 19 may also be made readily accessible for removal or maintenance.

If it should be required to remove the rotor 11 of the generator, a pit 50 may be provided directly below the rotor for this purpose. One side of the pit may be semi-circular, and the other side may be provided with an inclined ramp 51. Suitable vehicles 52, 53 to receive and support the rotor may be provided, the vehicle 52 straddling the ramp 51 and being provided with a pivoted fitting 54 to receive the upper end of the rotor, and the vehicle 53 having two separate bogies, one on each side of the ramp 51, across which bridging members 55 may be placed to support the rotor. Moreover an apertured support member 56 may be positioned at the base of the pit 50.

For the purpose of this description it is assumed that the lower bearing 14 is the thrust bearing, though the upper bearing 13 may be the thrust bearing in which case the procedure must be modified so that the weight of the rotor is supported from the crane before the bearing is removed.

To remove the rotor 11, the turbine 21, shaft 20, and bearing assembly 13 are first dismantled. The weight of the rotor 11 is supported in the thrust bearing 14, and appropriate temporary supports may be inserted to prevent tilting of the rotor. The rotor is then attached to the hook 47 of the crane 46, and the weight taken by the crane. The exciter and auxiliaries 19 are then removed, and the thrust bearing 14 may then be dismantled.

The rotor 11 is then lowered by the crane 46 through the stator 12 into the pit 50 until the upper end of the rotor is clear of the lower end of the stator. The lower end of the rotor is guided into the aperture of the support member 56. The rotor is then allowed to tilt over under the control of a separate block and tackle 57 secured to the stationary structure; as soon as the weight is taken by the separate block and tackle the hook 47 may be disengaged. The upper end of the rotor 11 engages in the pivoted fitting 54 of the vehicle 52.

The hook 47 is then secured to the support member 56 at the lower end of the rotor 11, and the rotor is raised to the horizontal position. Bridging members 55 are then inserted across the two bogies of vehicle 53, and the rotor lowered slightly so that its weight is taken by the bridging members.

The hook 47 may then be disengaged and the rotor 11 removed horizontally on the vehicles 52, 53.

In a preferred design, the stack 40 is supported from the top of the inner wall 31 by means of three beams arranged in the form of an equilateral triangle, the apices of the triangle being on the wall 31, and the stack passing through the triangle.

It will also be understood that the structure 17 surrounding the stator winding 12 may be fabricated of steel, rather than of concrete.

The term generator as used herein includes both D.C. and A.C. machines.

In certain cases the gas-producer units 24 may be mounted vertically, instead of horizontally as shown, enabling the width of the installation to be reduced.

What I claim as my invention and desire to secure by Letters Patent is:

1. A stationary turbogenerator installation including an electric generator having a vertically-disposed generator stator and a generator rotor mounted to rotate about a vertical axis in said stator, an axial-flow turbine having a turbine rotor and a turbine stator, said turbine rotor being above said generator rotor and including a shaft directly connected to said generator rotor to rotate therewith about said vertical axis, and said turbine rotor further including a ring of rotor blades, said turbine stator having a ring of stationary nozzle guide vanes cooperating with said ring of rotor blades and below said rotor blades, at least three gas turbine gas-producer units spaced around said vertical axis, each gas turbine gas-producer unit having an air intake, a compressor, combustion equipment, a turbine, and an exhaust in flow series, a plurality of curved ducts each having a circular inlet portion connected to the exhaust of a gas-turbine gas producer unit and each having an arcuate annularly-extending outlet portion defining a vertical flow passage below said ring of nozzle guide vanes and registering with part of said ring of nozzle guide vanes to discharge directly thereto, and exhaust stack means disposed above said turbine rotor.

2. A stationary turbogenerator installation as claimed in claim 1 wherein said axial-flow turbine is so designed that the predominant part of the pressure drop therethrough takes place in said stationary nozzle guide vanes and said rotor blades are substantially of impulse design.

3. A stationary turbogenerator installation as claimed in claim 1 wherein said outlet portions of said curved ducts together form a complete circular annulus.

4. A stationary turbogenerator installation as claimed in claim 3, wherein said turbine stator is mounted on said generator stator.

5. A stationary turbogenerator installation as claimed in claim 1 including also bearing means at the upper and lower ends of said generator stator, said generator rotor being mounted to rotate in said bearing means, and said bearing means being capable of dismantling in situ, and said generator rotor being so dimensioned that its maximum diameter does not exceed the minimum internal diameter of the generator stator, whereby it may be passed vertically through said generator stator for removal without dismantling said generator stator.

References Cited by the Examiner

UNITED STATES PATENTS

| 1,923,126 | 8/1933 | Tucker | 290—52 |
| 2,576,284 | 11/1951 | Crocchi | 290—52 X |
| 2,853,638 | 9/1958 | Bonnano et al. | 290—52 X |
| 3,087,691 | 4/1963 | Rainbow. | |
| 3,151,250 | 9/1964 | Carlson | 290—52 |
| 3,172,257 | 3/1965 | Hornschurch | 60—39.15 |
| 3,199,292 | 8/1965 | Berger et al. | 60—39.15 X |

ORIS L. RADER, *Primary Examiner.*

G. SIMMONS, *Assistant Examiner.*